United States Patent Office 3,084,220
Patented Apr. 2, 1963

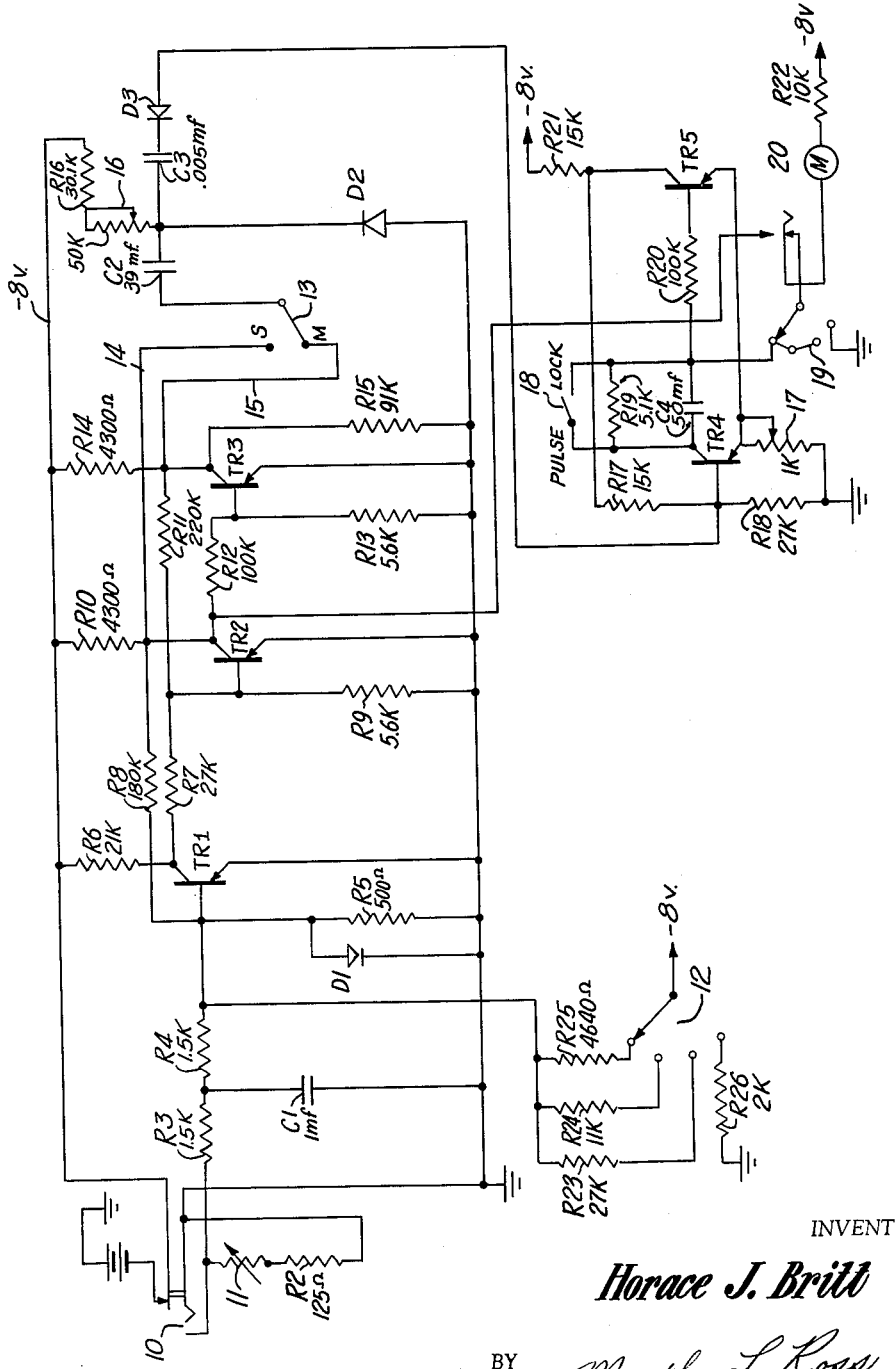

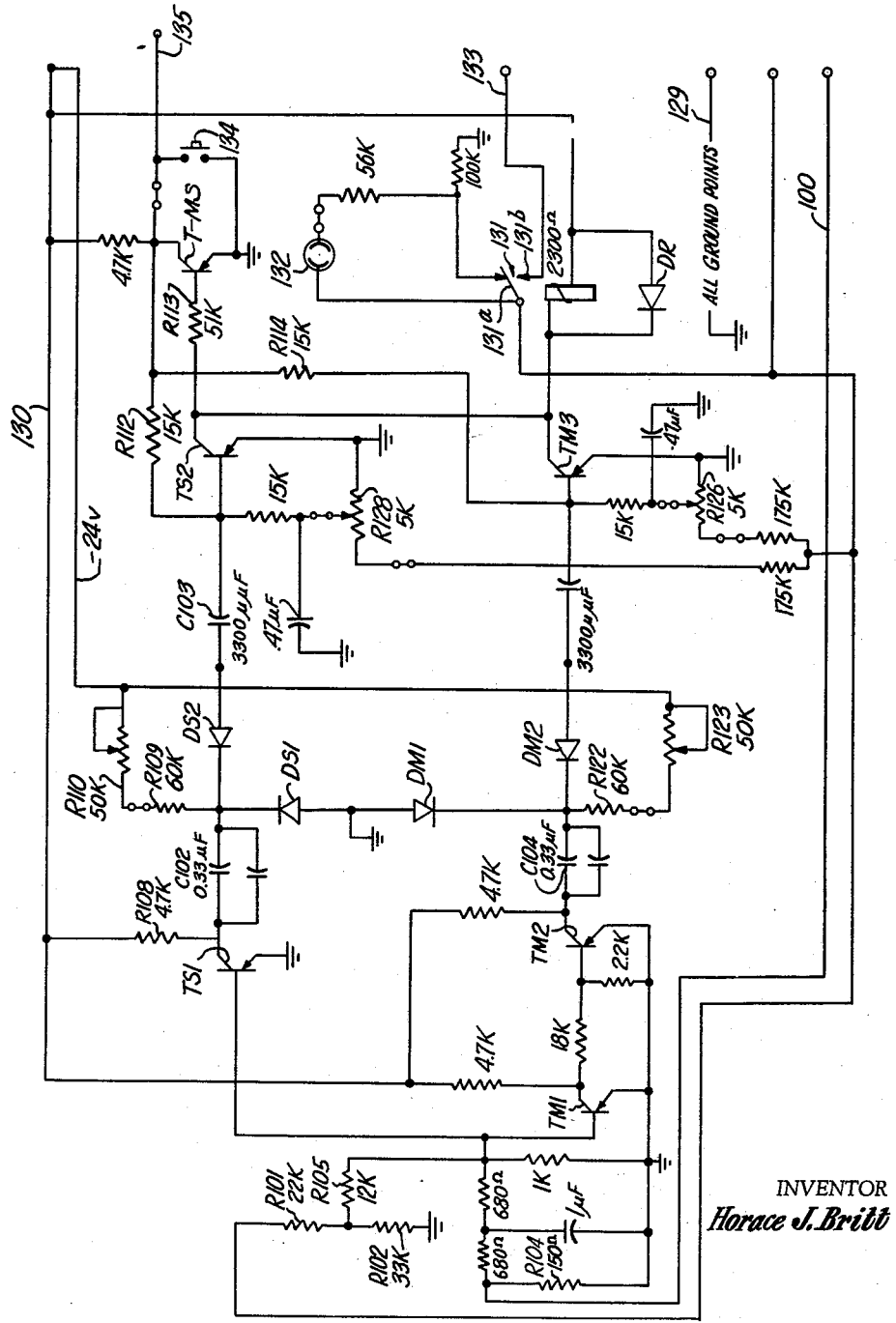

3,084,220
MEASURING DEVICES
Horace J. Britt, Alexandria, Va., assignor to Atlantic Research Corporation, Fairfax, Va., a corporation of Virginia
Filed Sept. 15, 1960, Ser. No. 56,137
14 Claims. (Cl. 178—69)

The present invention relates in general to pulse distortion measuring equipment, and more particularly to apparatus for measuring and indicating distortion of marking or spacing pulses in code signals such as those used in teletypewriter or data transmission systems.

For effective control and trouble shooting of circuits of the type encountered in teletypewriter and data transmission systems employing coded trains of impulses, it is useful to be able to reliably detect the existence of distortion of the signal impulses. There are several basic types of distortion which affect the reliability of telegraph and data signals to produce proper operation of the system components. A common feature of each of these types of distortion is that the marking or spacing pulses are lengthened or shortened by the distortion, either in a uniform or a random manner. By measuring the pulses by comparing, in some way, the shortest pulse of a series of pulses with a standard or unit pulse length, the amount of distortion can be discerned. This technique of measuring the shortest pulse affords a means of detecting the basic types of telegraph signal distortion with a reasonable sampling of pulses. It has been found that as long as the signals do not exceed a given amount of distortion, they are sufficiently intelligible to provide reliable operation of the system equipment, so that test equipment which reliably monitors the signals to ensure that they do not exceed a particular amount of distortion is usually adequate.

Efforts have been made heretofore to provide a reasonably accurate device which could be widely furnished to field test men for measuring and indicating signal distortion of such telegraph and data pulse signals, but prior devices have been highly complex, expensive and bulky to transport. Further, many of the devices heretofore proposed have operated on only marking pulses or spacing pulses, but not both, so that these devices were limited in their application because of the requirement that the signals have a particular formation. Such prior art devices frequently relied upon a flashing signal lamp to indicate the occurrence of shortened pulses. This, however, produced substantial battery drain and therefore increased the size or number of batteries required, and did not provide an indication of a nature that could be readily depended upon for checking the need for calibration or battery replacement.

An object of the present invention, therefore, is the provision of novel pulse distortion measuring apparatus for use by field test men in detecting distortion of telegraph signal pulses, which is fully transistorized to make it small, battery operated, and free from relay and vacuum tube maintenance, and is of highly compact construction to permit the apparatus to be readily carried in the field.

Another object of the present invention is the provision of a novel transistorized pulse distortion indicating instrument for measuring and indicating the occurrence of either marking pulses or spacing pulses which are shorter than a selected unit or standard pulse length in a teletypewriter or data code pulse signal.

Another object of the present invention is the provision of a novel pulse distortion measuring instrument for measuring and indicating the occurrence of shortened marking or spacing pulses in a teletypewriter or data signal, wherein the instrument is provided with an indicating meter which is deflected to indicate the occurrence of shortened pulses, which reduces battery drain relative to that encountered with flashing lamp indicators, and which provides convenient means for checking the need for calibration and battery replacement and correctness of input polarity.

Other objects, advantages, and capabilities of the present invention will become apparent from the following detail description, taken in conjunction with the accompany drawings illustrating two exemplary embodiments of the present invention.

In the drawings:

FIGURE 1 is a schematic diagram of one form of the present invention especially adapted for portable field use; and FIGURE 2 is a schematic diagram of another embodiment of the present invention adapted for test center installations.

Referring to FIGURE 1, the device of the present invention is a fully transistorized signal distortion indicator for use by field test men in monitoring five or six unit impulse code teletypewriter signals at transmitting speeds of 60, 75 or 100 words per minute to determine whether the mark pulses or the space pulses are shorter than a preselected unit or standard length. A Mark-Space switch is provided to permit selection of whether the apparatus will respond to marking pulses or spacing pulses. A two-bank input selection switch having four positions is provided to set the apparatus to measure pulses of 20 ma. level at one position, pulses of 60 ma. level at another position, and pulses varying above and below zero at a position labeled "Polar." This switch also has a fourth position for checking battery voltage. The circuit, in general, comprises a normally conducting input transistor to which signals are fed through a voltage divider network and a time delay network, a pair of switching transistors, one of which is turned off in response to switching of the input transistor to nonconducting state, to apply voltages to a timing capacitor in selected relation to transitions of the incoming signal between marking and spacing levels depending upon the setting of the Mark-Space switch, and a metering circuit including a pair of transistors and a milliameter which responds to voltage pips produced in response to conditions of the timing capacitor when pulses of shorter than unit or other selected reference length are monitored to produce observable deflection of the meter pointer. A Pulse-Lock switch is also provided to cause the meter pointer to either pulse in response to each distortion sensed or to give a steady reading of the current indicative of the distortion sensed. A knob or manual adjustment for a potentiometer in the discharge circuit of the timing capacitor is calibrated in terms of percentage distortion for 60, 75 and 100 words per minute transmission speed to permit a reading of percentage distortion to be obtained.

In the ensuing detail description of the components and operation of the circuit, the components will be described generally in the order they are encountered by the incoming signals. For convenience, it will be assumed that the set is connected to a 60 ma. neutral teletypewriter circuit and the Mark-Space switch is in the Mark position, wherein the set measures marking bias. The signals are introduced through an input jack 10 interposed in a voltage divider network including potentiometer 11, resistors R2, R3 and R4, and either resistor R23, R24, or R25 as determined by the setting of the movable contact of input selector switch 12 having polar, 20 ma., and 60 ma. positions respectively, and a fourth, battery position. The signals coupled through the jack 10 are applied to the base of input transistor TR1, whose collector is connected through R6 to −8 volt potential source, preferably an 8 volt mercury battery supplied with the set, and whose emitter is connected directly to circuit ground (not earth ground). A resistor R5 and diode D1 are also connected between the base of input transistor TR1 and ground. The base of transistor TR2 is connected to the collector of transistor TR1 through resistor R7 and to ground through resistor R9, its emitter is connected directly to ground, and its collector is connected to the −8 volt source through resistor R10, the base of grounded transistor TR3 is connected to the collector of transistor TR2 through resistor R12 and to ground through resistor R13 and its collector is connected to the −8 volt source through resistor R14, to ground through resistor R15, and to the base of transistor TR2 through resistor R11.

The collector of transistor TR2 is connected to terminal S of Mark-Space switch 13 through lead 14, and the collector of transistor TR3 is connected to the terminal M of this switch 13 through lead 15. The switch 13 applies the voltages at the collector of either transistors TR2 or TR3 to the one side of timing capacitor C2, the other side of which is connected to the −8 volt source through potentiometer 16 and resistor R16 and which is held against going below essentially ground potential by diode D2 connected to ground.

The right side of the timing capacitor C2 is also connected through capacitor C3 and diode D3 across a voltage divider network formed of resistors R18, R17 and R21 to the base of transistor TR4 in a two-transistor metering circuit including transistors TR4 and TR5. The emitters of the transistors TR4 and TR5 are connected in common through a calibrating potentiometer 17 to ground. The collector of transistor TR4 is connected to a network formed of capacitor C4, resistor R19, and Pulse-Lock switch 18, which in turn is connected to the base of transistor TR5 through resistor R20 and to switch 19 by which the voltages derived from the network of C4 and R19 are coupled to the milliammeter 20.

In measuring shaped pulses it is important that transistor TR1 trigger at the half current level to simulate the operation of relays used in teletypewriter system components. Resistors R23, R24 and R25 associated with switch 12 provide the proper bias on transistor TR1 for a half current triggering level for 20 ma., 60 ma. and polar signals. While the 8 volt mercury battery supplied with the set has very stable characteristics, its voltage at the beginning of its life is approximately .2 volt higher than it is shortly after use, and after long use the voltage drops still further near the end of the battery life. Potentiometer 11 permits adjusting the triggering level to the exact operating voltage. This adjustment holds for operation of this set in the 60 ma., 20 ma. or polar positions.

Resistors R3, R4 and capacitor C1 introduce a time delay of about 1 millisecond in the response of transistor TR1 to the teletypewriter signal transitions so as to prevent transistor TR1 from operating falsely due to short interruption of the pulse, as, for example, from relay bounce. Diode D1 makes the resistance of the base emitter circuit of transistor TR1 more symmetrical for the delay circuit for the on and off condition of transistor TR1.

When the circuit is idle or in marking condition, the 60 ma. current produces a voltage across potentiometer 11 and resistor R2, which is approximately 9 volts depending on setting of potentiometer 11. This voltage back biases transistor TR1 overcoming the forward bias supplied through resistor R25 from the −8 volt source. Thus transistor TR1 is off for the marking condition of the circuit.

When transistor TR1 is off the −8 volt source through resistors R6 and R7 supplies base-emitter current to transistor TR2 turning it on. When transistor TR2 is on, its collector is essentially at ground potential. The collector of transistor TR2 being at ground potential cuts off base-emitter current to transistor TR3 and thus transistor TR3 is off.

Resistors R9 and R13 connected between the base and emitter circuit of transistors TR2 and TR3, respectively, reduce the collector leakage current of these transistors when they are in their off condition.

When transistor TR3 began to cut off, the −8 volt source through resistors R14 and R11 supplied triggering current to the base-emitter circuit of transistor TR2 causing it to cut on very quickly. When transistor TR3 was off, the −8 volt source, through resistor R14 and diode D2 charges capacitor C2 to slightly less than −8 volts. The left side of capacitor C2, as viewed in the drawing, is thus negative and the right side is essentially at ground potential due to conduction of diode D2.

Since the right side of capacitor C2 is essentially at ground potential and because of the presence of capacitor C3, and the reverse bias supplied through potentiometer 17, transistor TR4 receives no base-emitter current. Thus transistor TR4 is turned off and meter 20 reads essentially zero.

When the teletypewriter circuit goes spacing, the voltage across potentiometer 11 and resistor R2 drops to essentially zero and the −8 volt source through resistor R25 forward biases transistor TR1 and turns it on. As transistor TR1 turns on its collector voltage drops to essentially zero, removing the base-emitter current of transistor TR2 and thereby turning transistor TR2 off. When transistor TR2 began to turn off, a negative triggering voltage is supplied to the base of transistor TR1 through resistors R10 and R8 causing transistor TR1 to quickly turn on and transistor TR2 to quickly turn off. When transistor TR2 turns off, the −8 volt source through resistors R10 and R12 supplies base-emitter current to transistor TR3 causing it to turn on. When transistor TR3 turns on the left side of capacitor C2 goes to essentially ground potential through lead 15 and the right side goes to positive potential of nearly 8 volts. Diode D2 being back biased cuts off. Diode D3 prevents this positive voltage from being applied through capacitor C3 to the base-emitter circuit of transistor TR4. This is to prevent transistor TR4 from being turned off thus holding meter 20 in the deflected position when switch 18 is in the locked position.

The potential on the right side of capacitor C2 falls exponentially as capacitor C2 discharges. The discharge path is from the −8 volt source thru resistor R16, potentiometer 16 and the collector emitter circuit of transistor TR3. Since transistor TR3 is conducting, its collector is essentially at ground. The exponential decay of capacitor C2 is governed by the setting of potentiometer 16. Potentiometer 16 is calibrated in percentage distortion for the various teletypewriter speeds.

If the spacing pulse is longer than the percentage distrotion setting of potentiometer 16, the voltage on the right side of capacitor C2 will fall to essentially ground potential by the end of the pulse being measured. If the spacing pulse is shorter than the potentiometer dial setting of potentiometer 16, the potential at the right side of capacitor C2 will be at some positive voltage level at the end of the measured pulse.

When the circuit goes marking, transistor TR3 turns off and the potential of its collector rises very quickly to nearly −8 volts. This rise in potential instantaneously causes diode D2 to conduct and the right side of capacitor C2 drops instantaneously to ground potential. At the end of a long pulse the right side of capacitor C2 would have been at ground potential, and therefore no voltage would have been transferred through capacitor C3 to the base circuit of transistor TR4. At the end of a short pulse, the potential on the right side of capacitor C2 would be at a positive value. When this voltage drops suddenly to ground potential a negative going voltage potential would pass through capacitor C3 and diode D3 causing transistor TR4 to turn on and give an indication on the indicating meter.

Transistor TR5 is normally conducting due to the current flow in its base-emitter circuit, the path of current flow being from ground through the calibrating potentiometer 17, emitter to base of transistor TR5, resistor R20, meter 20, and resistor R22 to the −8 volt source. A negative potential is therefore developed at the emitter of transistor TR4, and this transistor is held nonconducting. The magnitude of this reverse biasing voltage on the emitter of transistor TR4 is controlled by the setting of the calibrating potentiometer 17.

When a teletypewriter pulse shorter than that set by capacitor C2 and the potentiometer 16 and resistor R16 is received, a negative pulse is developed across capacitor C3 and applied to the base of transistor TR4. If this negative pulse overcomes the reverse bias voltage applied from the calibrating potentiometer 17, transistor TR4 will conduct. When the transistor TR4 conducts, its collector goes to near ground potential, greatly reducing the current in the base-emitter circuit of transistor TR5, and transistor TR5 cuts off. The potential at the collector of transistor TR5 goes negative and is applied to the base-emitter circuit of transistor TR4, through resistors R21 and R17, and transistor TR4 is held conducting as long as transistor TR5 is held non-conducting.

When switch 18 is in the Lock position, transistor TR4 continues to conduct, the path being from ground, through the calibrating potentiometer 17, its emitter-collector circuit, meter 20, and resistor R22 to ground. Meter 20 will give a steady reading of the current, indicating that a teletypewriter pulse has been received which is distorted greater than the level established by timing capacitor C2 and the setting of the potentiometer 16. If additional distrotion peaks are received, the conduction of transistor TR4 and the meter indication will not be effected.

If switch 18 is in the Pulse position, the short circuit is removed from capacitor C4, and the conduction of transistor TR4 causes this capacitor to begin to charge. As capacitor C4 charges the potential on the base of transistor TR5 goes increasingly negative, and transistor TR5 will conduct. As previously described, the conduction of transistor TR5 causes transistor TR4 to cut off. Meter 20 then responds to the conduction of transistor TR4 until capacitor C4 is sufficiently charged to cut on transistor TR5 and cut off transistor TR4, a time interval of less than one second. When transistor TR4 cuts off, the charge on capacitor C4 is discharged through resistor R19. As each distortion-peak is received, transistor TR4 cuts on, as described above, and then cuts off, causing the meter 20 to pulse.

It will be noted that the apparatus, when the switch 13 is in the M position to measure marking distortion, actually measures shortened spacing pulses. To measure the spacing distortion switch 13 must be in the S position, wherein the apparatus actually measures shortened marking pulses. Measurement of the marking pulse occurs in the same manner as just described for the spacing pulse.

Typical values for the circuit components of an exemplary embodiment of the invention are indicated in the drawing.

FIGURE 2 illustrates schematically a pulse distortion indicator which is similar in many respects to the previously described embodiment, but which is especially designed to be installed in a teletypewriter system test center as a monitor with a selected distortion setting to give a sensible indication when signals distorted more than the selected level are received. This circuit includes one measuring channel for measuring spacing bias and another channel for measuring marking bias. The spacing bias measuring channel includes switching transistor TS1, timing capacitor C102, and resistors R109 and R110 in the charging path of the timing capacitor, while the marking bias measuring channel includes switching transistor TM2, timing capacitor C104 and charging path resistors R122 and R123. Transistor TM1 provides proper phase inversion for switching transistor TM2. Transistors TS2 and TM3 respectively associated with the spacing and marking channels, and transistor T–MS serve generally similar functions as transistors TR4 and TR5 described in the preceeding embodiment. The circuit is designed to be operated from a receive relay (not shown) or other source of essentially square-wave signals provided in the test center apparatus, which is shifted to spacing condition or marking condition in response to incoming spacing or marking pulses. This circuit will be understood from the following description of its operation.

Assuming the input lead 100 and the circuit ground lead 129, connected across resistor R104, are connected into an external neutral 60 ma. signal pulse circuit in the spacing condition, no external current flows through input resistor R104. The polarity of the biasing voltage is such as to cause transistors TM1 and TS1 to be cut off. With external signal pulse circuit in the marking condition, the input current, which is approximately 60 ma., creates a voltage drop across R104, which is of polarity such as to forward bias transistors TS1 and TM1 and these now conduct heavily. Transistor TM2 is cut off Operation of the external signal pulse circuit, therefore, causes transistor TS1 to conduct during marking pulses and transistor TM2 to conduct during spacing pulses. The bias established by the network R101, R102 and R105, for transistors TM1 and TS1 is set at such a value that the switching of these transistors will occur approximately mid-wave on the 60–0–60 ma. current transitions, that is, at about 30 ma.

The description which follows covers the circuit operation as related to the switching action of transistor TS1 in the "mark-pulsing, spacing-bias measuring" circuit. Since circuitry following transistor TM2 is identical, similar circuit operation results.

Prior to a marking condition, transistor TS1 is cut off and capacitor C102 is charged to the value of the voltage supply on lead 130, which is about 24 volts. The charging path is from the positive side (ground) of the collector voltage, through diode DS1, capacitor C102 and resistor R108 to the −24 volt supply. With respect to ground, the left side of C102 is −24 volts and the right side is at ground potential. When a marking pulse is received, transistor TS1 conduts. It then effectively acts as a switch to place ground on the left side of capacitor C102. The potential on the right side of the capacitor instantly rises from ground potential to +24 volts. Diode DS1 cuts off. Capacitor C102 starts to discharge exponentially. The discharge path is through resistor R109, potentiometer R110, the aiding negative 24 volts collector supply, and transistor TS1. Thus, the potential on the right side of capacitor C102 decreases. This potential would, if it were not for the action of diode DS1, continue to decrease until it had reached −24 volts and fully charged the capacitor with a polarity opposite to that of the original charge. However, when the potential drops to an only slightly negative value, diode DS1 conducts. This action clamps the right side of capacitor C102 at near ground potential. With both sides grounded, capacitor C102 is fully discharged.

At the end of the marking pulse, transistor TS1 cuts off and removes ground from the left side of capacitor C102. The potential on the right side of the capacitor instantly drops from the positive value present at the time of switching to ground potential. The initial impulse is to drop to a negative value approximately equal (disregarding the voltage divider action between resistors R109 and R110) to a value equal to the difference between the −24 volt collector supply voltage and the initial positive voltage value. Any attempt of this voltage to drop to a negative value, however, is effectively resisted by diode DS1 which clamps the right side of capacitor C102 at ground potential in connection with the recharging process which is initiated immediately on switching.

The negative-going voltage pip originating on the right side of capacitor C102 when transistor TS1 cuts off is readily passed through diode DS2 and capacitor C103 to the base-emitter circuit of transistor TS2. This circuit is reverse biased by R128 and the negative-going voltage pip received from capacitor C102 is in such a direction as to make the transistor TS2 conduit. Conduction will not occur, however, until the value of the pip injected into the circuit exceeds the reverse bias. The magnitude of the voltage pip originating at the right side of capacitor C102 is directly related to the residual charge on the capacitor at the moment of switching. It is apparent that on an extremely short pulse, where the capacitor has had no opportunity to discharge, this pip will approximate 24 volts. On a long pulse, where the capacitor has been fully discharged, the pip will not be significant. The rate at which capacitor C102 discharges depends upon the RC circuit time constant of capacitor C102, and resistor R109 and potentiometer R110. Thus potentiometer R110 may be adjusted so that the charge on capacitor C102 is just below that which produces a significant voltage pip when transistor TS1 cuts off. Therefore, the setting of potentiometer R110 is directly related to the length of the marking pulse. A dial which operates potentiometer R110 is calibrated in terms of spacing distortion (shortened mark) and provides settings from zero to forty percent.

Conduction by transistor TS2 will occur when the reverse bias provided in its base-emitter circuit by calibrating potentiometer R128 is reduced to a value numerically equal to that of the negative pip received from capacitor C102. When transistor TS2 is in its normally cutoff condition, transistor T–MS is conducting due to the negative or forward bias supplied to its base-emitter circuit. This bias is provided by resistor R113 from the collector supply voltage appearing at the collector of transistor TS2. When transistor TS2 conducts, the collector supply voltage is effectively grounded at the collector terminal. Transistor T–MS then cuts off. The negative collector supply voltage at the collector of transistor T–MS is then applied, through resistor R112, to the base of transistor TS2. This holds transistor TS2 in a conducting condition.

Current flowing in the collector circuit of transistor TS2 operates a suitable slave device to produce a sensible indication that a pulse distorted more than the level set by potentiometers R110 or R123 has been received. In the particular example shown in FIGURE 2, conduction of either transistor TS2 or TM3 causes the coil of relay 131 to be energized, shifting its contact 131a down and lighting the distortion indicating lamp 132. A normally open stationary contact 131b may also be provided in relay 131 to automatically initiate some desired function in the associated test center equipment by placing voltage on the exit lead 133 when the relay 131 is energized. It will be noted that the relay 131 is shunted by diode DR, which suppresses the large voltage caused by the collapsing field, which might cause damage to transistors TS2 or TM3 when either of them cuts-off.

The effect of transistor T–MS cutting off when either transistor TS2 or TM3 conducts is to hold the latter in a conducting state. Conduction of transistor TS2 or TM3 is terminated by depressing switch 134, which grounds out the collector supply voltage applied through resistors R112 and R114 to the base of transistors TS2 or TM3, or by actuation of some remote grounding facility such as grounding relay contacts connected to exit lead 135. When the transistors TS2 and TM3 are both in cut off condition, the relay 131 in their common collector circuit releases and the circuit is in condition to respond to and indicate any additional distorted pulses received by it.

Two specific embodiments of the invention have been shown and described as it applies to the measurement and monitoring of teletypewriter pulses. The measurement and monitoring of data pulses would use the very same circuitry as that previously described, with the simply-accomplished exception that the input circuitry would be arranged to parallel the circuit to be measured, presenting a high input impedance, rather than connected in series as with teletypewriter circuits, presenting a low input impedance.

It will be apparent that various modifications may be made therein within the spirit and scope of the invention and it is desired, therefore, that only such limitations be placed on the invention as are imposed by the prior art and set forth in the appended claims.

What is claimed is:

1. A monitoring device for measuring and indicating the distortion of pulses in a pulse train comprising a timing capacitor, a variable impedance charging path connected between one side of said capacitor and a negative voltage source, switching transistor means for connecting the other side of said timing capacitor to substantially ground potential and to said negative potential source during the respective presence and absence of said pulses, means preventing said one side of said timing capacitor from achieving a voltage more negative than a predetermined value, a circuit connected to said one side of said timing capacitor activated when the potential is at a level different from said predetermined value at the end of selected pulses including indicator means and means responsive to negative voltage transitions of greater than a selected magnitude at said one side of said timing capacitor upon termination of a selected pulse of reduced pulse length relative to a standard pulse length to activate the indicator means to produce a sensible indication, and means connected to said switching transistor means for preventing false indications of distortion caused by small pulse discontinuities.

2. A monitoring device for measuring and indicating the distortion of marking and spacing types of pulses in coded signals comprising a timing capacitor, a variable impedance charging path connected between one side of said capacitor and a negative voltage source, switching transistor means for connecting the other side of said timing capacitor to substantially ground potential and to said negative potential source during the respective presence and absence of pulses of a selected one of said types, means preventing said one side of said timing capacitor from achieving a voltage more negative than a predetermined value, a metering circuit connected to said one side of said timing capacitor activated when the potential is at a level different from said predetermined value at the end of each pulse being measured including a meter having a shiftable pointer and means responsive to negative voltage transitions at said one side of said timing capacitor upon termination of a measured pulse of reduced pulse length relative to a standard pulse length to produce a sensible deflection of the meter pointer, and means connected to said switching transistor means for preventing false indications of distortion caused by small pulse discontinuities.

3. A monitoring device for measuring and indicating the distortion of marking and spacing type pulses in coded signals comprising an input transistor biased to conduct during the application thereto of a first type of impulses in said signal and to be shifted to a non-conducting state upon application thereto of a second type of impulses in said signal, a timing capacitor, a variable impedance charging path connected between one side of said capacitor and a negative voltage source, switching transistor means responsive to conduction and non-conduction of said input transistor for connecting the other side of said timing capacitor to substantially ground potential and to said negative potential source during the respective presence and absence of pulses of a selected one of said types, means preventing said one side of said timing capacitor from achieving a voltage more negative than a predetermined value, a metering circuit connected to said one side of said timing capacitor activated when the potential is at a level different from said predetermined value at the end of each pulse being measured including a meter having a shiftable pointer and means responsive to negative voltage transitions at said one side of said timing capacitor upon termination of a measured pulse of reduced pulse length relative to a standard pulse length to produce a sensible deflection of the meter pointer, and means connected to said input transistor for preventing false indications of distortion caused by small pulse discontinuities.

4. A monitoring device for measuring and indicating the distortion of marking and spacing type pulses in coded signals comprising an input transistor biased to conduct during the application thereto of a first type of impulses in said signal and to be shifted to a non-conducting state upon application thereto of a second type of impulses in said signal, a timing capacitor, a variable impedance charging path connected between one side of said capacitor and a negative voltage source, a switch having a movable contact connecting the other side of said timing capacitor to one of a pair of stationary switch contacts, a first switching transistor responsive to conduction and non-conduction of said input transistor connected to one of said stationary contacts and a second switching transistor responsive to conduction and non-conduction of said first switching transistor connected to the other of said stationary contacts for connecting the other side of said timing capacitor to substantially ground potential and to said negative potential source during the presence and absence of pulses of a selected one of said types in accordance with the position of the movable contact of said switch, means preventing said one side of said timing capacitor from achieving a voltage more negative than a predetermined value and a metering circuit connected to said one side of said timing capacitor activated when the potential is at a level different from said predetermined value at the end of each pulse being measured including a meter having a shiftable pointer and means responsive to negative voltage transitions at said one side of said timing capacitor upon termination of a measured pulse of reduced pulse length relative to a standard pulse length to produce a sensible deflection of the meter pointer.

5. A monitoring device as defined in claim 2, wherein said variable impedance charging path includes a variable potentiometer calibrated in percentage distortion for a plurality of selected pulse transmission speeds for varying the charging rate of said timing capacitor.

6. A monitoring device as defined in claim 3, wherein said variable impedance charging path includes a variable potentiometer calibrated in percentage distortion for a plurality of selected pulse transmission speeds for varying the charging rate of said timing capacitor.

7. A monitoring device as defined in claim 2 wherein said metering circuit includes a normally non-conducting first transistor responsive to said negative voltage transitions to conduct upon their occurrence, means connecting said meter between the collector of said first transistor and said negative voltage source, and a normally-conducting second transistor intercoupled with the collector of said first transistor through a capacitor for holding said first transistor conducting for a selected time following initiation of conduction thereof related to the charge rate of said capacitor.

8. A monitoring device as defined in claim 2 wherein said metering circuit includes a normally non-conducting first transistor responsive to said negative voltage transitions to conduct upon their occurrence, means connecting said meter between the collector of said first transistor and said negative voltage source, a normally-conducting transistor intercoupled with the collector of said first transistor through a capacitor for holding said first transistor conducting for a selected time following initiation of conduction thereof related to the charge rate of said capacitor, and switch controlled circuit means by-passing said capacitor for causing said first transistor to continue its conducting state upon initiation of conduction thereof.

9. A monitoring device for measuring and indicating the distortion of marking and spacing type pulses in telegraph coded signals comprising an input transistor biased to conduct during the application thereto of a first type of impulses in said signal and to be shifted to a non-conducting state upon application thereto of a second type of impulses in said signal, a timing capacitor, a variable impedance charging path connected between one side of said capacitor and negative voltage source, a switch having a movable contact connecting the other side of said timing capacitor to one of a pair of stationary switch contacts, a first switching transistor responsive to conduction and non-conduction of said input transistor connected to one of said stationary contacts and a second switching transistor responsive to conduction and non-conduction of said first switching transistor connected to the other of said stationary contacts for connecting the other side of said timing capacitor to substantially ground potential and to said negative potential source during the presence and absence of pulses of a selected one of said types in accordance with the position of the movable contact of said switch, means preventing said one side of said timing capacitor from achieving a voltage more negative than a predetermined value, and means connected to said one side of said timing capacitor responsive to negative voltage transitions at said one side produced upon termination of pulses of the selected type which are shorter than a selected standard pulse length for producing a sensible indication thereof.

10. A monitoring device as defined in claim 2 wherein said metering circuit includes a normally non-conducting first transistor responsive to said negative voltage transitions to conduct upon their occurrence, means connecting said meter between the collector of said first transistor and said negative voltage source, and a normally-conducting second transistor intercoupled with the collector of said first transistor for holding said first transistor conducting for at least a period greater than the duration of said negative voltage transition.

11. A monitoring device for measuring and indicating the distortion of pulses in a pulse train comprising a timing capacitor, a variable impedance charging path connected between one side of said capacitor and a negative voltage source, switching transistor means for connecting the other side of said timing capacitor to substantially ground potential and to said negative potential source during the respective presence and absence of said pulses, means preventing said one side of said timing capacitor from achieving a voltage more negative than a predetermined value, a circuit connected to said one side of said timing capacitor for producing a sensible indication upon the occurrence of selected pulses having a shorter pulse length than a preselected standard pulse length including a normally non-conducting first transistor coupled to said one side of said timing capacitor and responsive to negative voltage transitions of greater than a selected magnitude at said one side of said timing capacitor to assume a state of conduction, a normally conducting second transistor intercoupled with the collector of said first transistor for holding said first transistor conducting for at least a greater period than the duration of the negative voltage transition, and indicator means responsive to conduction of said first transistor to produce a sensible indication.

12. A monitoring device for measuring and indicating the occurrence of shortened marking and spacing type pulses in telegraph code signals comprising a first channel for measuring marking type pulses and a second channel for measuring spacing type pulses, each of said channels including a timing capacitor, a variable impedance charging path connected between one side of each timing capacitor and a negative voltage source, a switching transistor for connecting the other side of each timing capacitor to substantially ground potential and to said negative potential source during the respective presence and absence of the pulses to which the associated channel is responsive, means preventing said one side of each timing capacitor from achieving a voltage more negative than a predetermined value, a common input network for applying the signals to both of said channels, a phase inversion transistor for inverting the phase of the signals applied to one of said channels, a normally non-conducting transistor for each of said channels responsive to negative voltage transitions of greater than a selected magnitude at said one side of said timing capacitors to assume a state of conduction, indicator means responsive to conduction of said last mentioned transistor in either of said channels to produce a sensible indication, and a normally conducting second transistor intercoupled with the collectors of the last mentioned transistor of each of said channels for holding the same in a conducting state for a selected period of time.

13. Apparatus for monitoring the distortion of pulses in a pulse train comprising an input transistor biased to conduct during the application thereto of a first type of impulse in said pulse train and to be shifted to a non-conducting state upon application thereto of a second type of impulse in said pulse train, a timing capacitor, a variable impedance charging path connected between one side of said capacitor and a negative voltage source, a first switching transistor responsive to conduction and non-conduction of said input transistor, a second switching transistor responsive to conduction and non-conduction of said first switching transistor for connecting the other side of said timing capacitor to substantially ground potential and to said negative potential source during the presence and absence of pulses of one of said types, means preventing said one side of said timing capacitor from achieving a voltage more negative than a predetermined value and means connected to said one side of said timing capacitor responsive to negative voltage transitions produced upon termination of pulses which are shorter than a selected standard pulse length for producing an indicating signal.

14. Apparatus for monitoring the distortion of pulses in a pulse train comprising a first channel for measuring a first type of impulse in said pulse train and a second channel for measuring a second type of impulse in said pulse train, each of said channels including a timing capacitor, a variable impedance charging path connected between one side of each timing capacitor and a negative voltage source, a switching transistor for connecting the other side of each timing capacitor to substantially ground potential and to said negative potential source during the respective presence and absence of the pulses to which the associated channel is responsive, and means preventing said one side of each timing capacitor from achieving a voltage more negative than a predetermined value, an input transistor biased to conduct during the application thereto of a first type of impulse in said pulse train and to be shifted to a non-conducting state upon application thereto of a second type of impulse in said pulse train, the output of said input transistor being connected to the input circuit of one of said switching transistors, and means connected to the output of both of said channels for producing an output signal in response to distortion of pulses in said pulse train greater than a selected amount.

References Cited in the file of this patent
UNITED STATES PATENTS

| | | |
|---|---|---|
| 2,490,530 | Loughlin | Dec. 6, 1949 |
| 2,619,542 | Carver | Nov. 25, 1952 |
| 2,938,077 | Holland et al. | May 24, 1960 |
| 2,939,915 | Britt et al. | June 7, 1960 |
| 2,961,489 | Carver | Nov. 22, 1960 |
| 2,985,716 | Day | May 23, 1961 |